Feb. 11, 1930.   R. J. NORTON   1,746,494
BRAKE DRUM
Filed Feb. 7, 1929
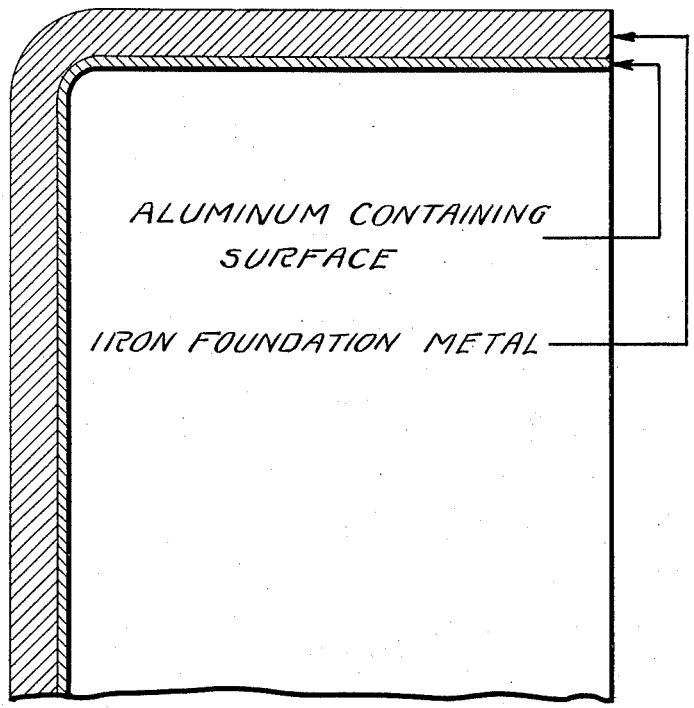
Inventor
RAYMOND J. NORTON
By M. W. McConkey, Semmes & Semmes
Attorneys Patented Feb. 11, 1930

1,746,494

UNITED STATES PATENT OFFICE

RAYMOND J. NORTON, OF WASHINGTON, DISTRICT OF COLUMBIA

BRAKE DRUM

Application filed February 7, 1929. Serial No. 338,282.

This invention relates to improvements in brake drums and is a continuation in part of application Serial No. 274,675, filed May 2, 1928, patented July 16, 1929, No. 1,720,853.

As is known, the typical form of brake mechanism comprises a brake drum and an associated internal expanding brake. This internal brake includes generally a metallic shoe to which is secured a friction material. During operation of the brake the interior surface may be exposed to the action of water or corrosive materials embodied in the friction material itself. For example, if the friction material were impregnated with a substance which would tend to corrode the drum, the life and efficiency of the drum would be commensurately shortened. Since the brake is of the friction type, any tendency to corrosion would be accelerated during use because of the catalytic effect of the generated heats.

It is a major object of this invention to improve brake drums by providing a braking flange which is of lower corrodibility than the major portion of the drum.

Another object is to generally increase the effective life of brake drums by protecting the drum against any corrosive agents which may be incorporated in the friction materials.

Another object is to improve brake drum structures employed with an internal expanding brake by protecting the interior of the brake drum and particularly the braking flange against corrosive agencies.

With these and other equally important objects in view, the invention comprehends the treatment of the interior braking flange of a ferruginous drum so as to change its physical characteristics and to increase its resistance to corrosion.

The single figure in the accompanying drawing illustrates a drum, in enlarged detail, treated in accordance with the invention.

In the prior application referred to, it was pointed out that brake drum structures might be improved generally by calorizing the exterior surface of the drum. This calorizing process serves to diffuse a predetermined amount of aluminum in the outer surface of the drum so as to form a molecularly bonded or integral skin of an aluminum containing compound. It was further pointed out that this treatment served to protect the exterior surface against corrosion and also to increase the heat emissivity from the radiating surface.

In the present improvement, use is made of this calorizing treatment, but it is applied to a different portion of the drum and is to subserve a different function.

The major object of the present invention is to provide a brake drum having an interior braking flange of relatively low corrodibility. It will be understood that there are a very large number of specific treatments available by which these objects may be effectuated. Because of the ease of treatment and because it serves as a clear illustration of the principles herein involved, the process of calorizing this interior braking flange will be described, although it is to be clearly understood that this is given merely to typify the variety of methods whereby the physical characteristics of a cast iron drum or a low carbon pressed steel drum may be modified so as to increase the corrosion resistance of the braking flange.

In the preferred method of carrying out the invention the drum, preferably a pressed steel drum, may be pre-formed and then cleaned by either pickling, sand blasting or wire brushing. The clean metal may then be placed in a suitable container so that the interior braking flange that is to say the frictional contact surface is contacted by a mass of finely divided aluminum. The material may then be heated under calorizing conditions.

As a typical example, the treated mass may comprise aluminum powder in which is incorporated a small quantity of ammonium chloride and zinc. The exterior surface of the drum may be covered with a member which protects it from the action of aluminum, or if desired the drum itself may be embedded in aluminum so as to calorize both the interior and exterior surfaces.

It will be appreciated that, if desired, the calorizing area may be of any determined extent. The calorizing mass, in contact with the metallic drum, may then be heated to calorizing temperatures which may range from 900° C., more or less, to approximately 950° C. Under these conditions the aluminum is dispersed through and alloyed with the ferruginous metal of the drum adjacent the contact surface. It will, of course, be understood that the heating may be varied in extent and intensity to regulate the degree of dispersion of the aluminum and to govern the character of the resulting unitary or integral structure.

After such treatment the drum then comprises a ferruginous foundation metal, the braking flange of which comprises a substantially integral metallic skin or coating, that is to say the aluminum alloy is molecularly bonded to the iron structure. It will be appreciated that after the calorizing treatment the drum may be removed and subjected to any annealing or other modifying treatment which will advantageously affect the finished drum.

The finished article then comprises a ferruginous drum having a skin or aluminum containing surface on the frictional contact surface of the braking flange. This skin or surface has a lower corrodibility than the body of the material of which the drum is composed. As a result, the braking flange is less liable to corrosion, especially under the accelerating conditions of high heats, due to the presence of corrosive substances in the friction material or to any other corrosive agencies.

It will be appreciated also that a novel braking drum may be made up by this treatment which presents a number of decided advantages. The interior and exterior surfaces of the braking flange may be calorized. The resulting article then will present an interior or friction contacting surface of relatively low corrodibility and an integral exterior skin or integral ring which has a higher coefficient of thermal emissivity than the iron and which in addition is of lower corrodibility. The drum then has the desirable characteristics of a low corrodibility both on the interior and exterior surfaces, and in addition transmits the generated heats through and dissipates such heats from its radiating surface at a greater rate than in the ordinary iron structures.

It is to be clearly understood that the example given is for the purpose of explaining the basic principles of the invention. It will be appreciated that metals other than aluminum may be utilized to form an internal skin or layer of alloy integrally united with the ferruginous base metal.

I claim:

1. A brake drum comprising a ferruginous foundation metal having an interior braking flange surface containing aluminum.

2. A brake drum comprising a ferruginous foundation metal having an interior braking flange comprising an aluminum alloy of the foundation metal.

3. A brake drum comprising a ferruginous foundation metal having an interior braking flange of an aluminous compound cemented to the foundation metal.

4. A brake drum comprising a foundation metal having an interior friction surface including an aluminous alloy of the foundation metal.

5. A brake drum comprising a foundation metal having an interior integral friction surface of an aluminum containing material.

6. A brake drum comprising a ferruginous foundation metal having an interior friction surface of an aluminum containing material.

7. A brake drum comprising a ferruginous head and braking flange, the interior surface of the flange containing aluminum.

In testimony whereof I affix my signature.

RAYMOND J. NORTON.